US005087926A

United States Patent [19]

Wakui

[11] Patent Number: 5,087,926

[45] Date of Patent: Feb. 11, 1992

[54] DUAL TOGGLE MECHANISM FOR PRESSING A THERMAL PRINTING HEAD AGAINST A PLATEN ROLL IN A PRINTER FOR USE WITH AN INSERTABLE CASSETTE

[75] Inventor: Yoshiaki Wakui, Suginami, Japan

[73] Assignee: Victor Company of Japan, Ltd., Yokohama, Japan

[21] Appl. No.: 501,942

[22] Filed: Mar. 30, 1990

[30] Foreign Application Priority Data

Mar. 31, 1989 [JP] Japan .................................. 1-83763

[51] Int. Cl.[5] ...................... B41J 25/304; B41J 2/325; G01D 15/00; G01D 15/22

[52] U.S. Cl. ................................ 346/76 PH; 346/145; 400/120

[58] Field of Search .......................... 346/76 PH, 145; 400/120

[56] References Cited

FOREIGN PATENT DOCUMENTS 0031669 2/1989 Japan .

*Primary Examiner*—Benjamin R. Fuller
*Assistant Examiner*—Huan Tran
*Attorney, Agent, or Firm*—Fleit, Jacobson, Cohn, Price, Holman & Stern

[57] ABSTRACT

A head pressing mechanism in a thermal ink transfer printer for use with an insertable cassette in which there are housed both an elongate strip of ink transfer sheet wound at least in part on, and extending between, a payoff mandrel and a detachable takeup mandrel, and a stack of recording sheets for thermally receiving ink from the ink transfer strip. The printer withdraws the takeup mandrel from within the cassette and positions it within the printer for holding the ink transfer strip between a thermal printing head and a platen, and draws the successive recording sheets from the cassette onto the platen. For pressing the thermal printing head against the platen with the transfer strip and a recording sheet for ink transfer interposed between the printing head and the platen, the head pressing mechanism comprises a pair of first toggle joints each connected between the printer frame and one of a pair of pivotal head arms holding the printing head, and a pair of second toggle joints each connected between one of the first toggle joints and the printer frame. The second toggle joints are both cam actuated from a common electric motor.

7 Claims, 8 Drawing Sheets

DUAL TOGGLE MECHANISM FOR PRESSING A THERMAL PRINTING HEAD AGAINST A PLATEN ROLL IN A PRINTER FOR USE WITH AN INSERTABLE CASSETTE

BACKGROUND OF THE INVENTION

This invention relates to a printer operating on the principle of thermal ink transfer, such that ink is thermally transferred from an ink transfer sheet to an ink recording sheet for reproduction of a desired image either in color or in black and white. More particularly, the invention concerns an improved mechanism in such a printer for pressing a thermal printing head against a platen via a superposition of the transfer sheet and the recording sheet. The printer with the improved head pressing mechanism is intended for use with an insertable cassette in which are housed both a stack of recording sheets and an elongate strip of transfer sheet.

The thermal ink transfer printer has won extensive commercial acceptance for the production of hard copies (i.e. those readable or appreciable without use of special device) of computer graphics or the like. Among the primary reasons for this popularity are simplicity in construction, fast printing speed, and ease of handling.

Basically, in the printer of this type, the recording sheet is printed upon while being pressed against a platen by the thermal printing head via the transfer sheet. The platen is driven as by a direct current motor or a pulse motor. The printing head has a plurality of electric heater elements which are aligned lengthwise of the transport roller. The electric current fed to the heater elements is controlled for printing dots on the recording sheet line by line with the incremental rotation of the platen.

For color printing, a color transfer sheet is employed which bears on its different sections the inks of the three primary colors, yellow, magenta and cyan. A black ink may also be used to add detail and contrast to the printed reproduction, as is well known in the printing art. The ink of a first preselected color is first transferred from the color transfer sheet to the recording sheet by automatically holding the recording sheet in register with the required ink section of the transfer sheet. Then the transfer sheet is fed a required distance for transferring the ink of a second preselected color to the recording sheet. The same procedure is repeated on the same recording sheet for each additional color until a full color printing is completed.

Of course, the color transfer sheet needs replacement as the inks are used up, and a new recording sheet is required for each printing operation. A known solution to the problem of how to overcome troubles with frequent transfer sheet replacement and recording sheet replenishment is a cassette in which there are housed both a color transfer sheet in the form of an elongate strip and a stack of recording sheets. The cassette can be readily inserted in the associated printer. The color transfer strip extends between a payoff and a takeup mandrel within the cassette. The insertion of this cassette in the printer serves the dual purpose of replacing the used transfer sheet and introducing a fresh supply of recording sheets.

The printer for use with the insertable cassette is constructed to take out the transfer strip takeup mandrel from within the cassette and to hold it in a preassigned position within the printer. Being anchored at one end to the takeup mandrel, the transfer strip is thus pulled out of the cassette and held against the platen. Also, the recording sheets are withdrawn one by one from within the cassette, introduced into the printer, and clamped against the platen preparatory to thermal ink transfer from the transfer sheet by the printing head.

Japanese Utility Model Application No. 63-31345 is hereby cited as a prior art printer designed for use with an insertable cassette, to which the present invention bears particular pertinence. This prior art printer has proved to be in need of improvement in regard to its mechanism for pressing the thermal printing head against the platen via the superposed transfer strip and recording sheet. The known head pressing mechanism has comprised a dedicated rotary solenoid together with an associated drive linkage. A drawback of this known mechanism is that it has unnecessarily increased the number of constituent parts of the printer and thus added to its manufacturing cost.

A particular objection is to the rotary solenoid, which is unduly expensive in consideration of the function for which it is intended. Moreover, the rotary solenoid must of necessity be inconveniently large in size for pressing the printing head with a sufficient force to assure high quality printings. Such a bulky rotary solenoid has demanded a correspondingly large installation space, with a consequent increase in the overall size of the printer itself. Additional difficulties with the rotary solenoid have been its great power requirement and much noise production.

SUMMARY OF THE INVENTION

The present invention has it as an object to simplify, and make more compact and less expensive, the known head pressing mechanism in the thermal ink transfer printer of the kind defined.

Another object of the invention is to provide such a head pressing mechanism which requires no dedicated drive source of its own but which can be driven from an electric motor that has been customarily employed in the printer for driving other working parts.

A further object of the invention is to provide such a hard pressing mechanism which, despite its simplicity in construction, can perform its intended functions no less positively and reliably than its conventional counterpart, without degrading the quality of the printing in any way.

Stated briefly, the present invention is directed to a thermal ink transfer printer of the type for use with an insertable cassette in which there are housed both an elongate strip of ink transfer sheet wound at least in part on, and extending between, a payoff mandrel and a detachable takeup mandrel, and a stack of recording sheets for thermally receiving ink from the ink transfer strip. The printer includes means for withdrawing the takeup mandrel from within the cassette and loading the takeup mandrel in a preassigned position within the printer in order to hold the ink transfer strip between a thermal printing head and a platen, and means for introducing the recording sheets from the cassette onto the platen one by one.

More specifically, the invention provides, in a printer of the kind defined, a head pressing mechanism for pressing the thermal printing head against the platen via the superposed transfer strip and recording sheet for ink transfer from the former to the latter. The head pressing mechanism comprises, in its simplest form, head support means rigidly supporting the thermal printing head and pivotally mounted to frame means so that the printing head is movably with the head support means into and out of engagement with the platen via the superposed transfer strip and recording sheet, a first toggle joint acting between the frame means and the head support means, and a second toggle joint acting between the frame means and the first toggle joint for causing the latter to move the head support means toward and away from the platen.

The dual toggle mechanism suggested above can be actuated by motor driven cam means that have been conventionally employed in the printer of the type under consideration. Accordingly, the head pressing mechanism requires no rotary solenoid or other dedicated drive source which would require great energy for operation or produce much noise. Additional advantages of the dual toggle mechanism are inexpensiveness in construction, compactness in size, and a high power amplifying capability.

A further feature of the invention resides in resilient means, normally including a spring, connected between the first toggle joint and the frame means for urging the head support means toward the platen. When the two toggle joints are both extended to press the printing head against the platen via the superposed transfer strip and recording sheet, the printing head is placed under the force of the resilient means, assuring the high quality production of the printed image on the recording sheet.

The above and other objects, features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

General

Figure 1:
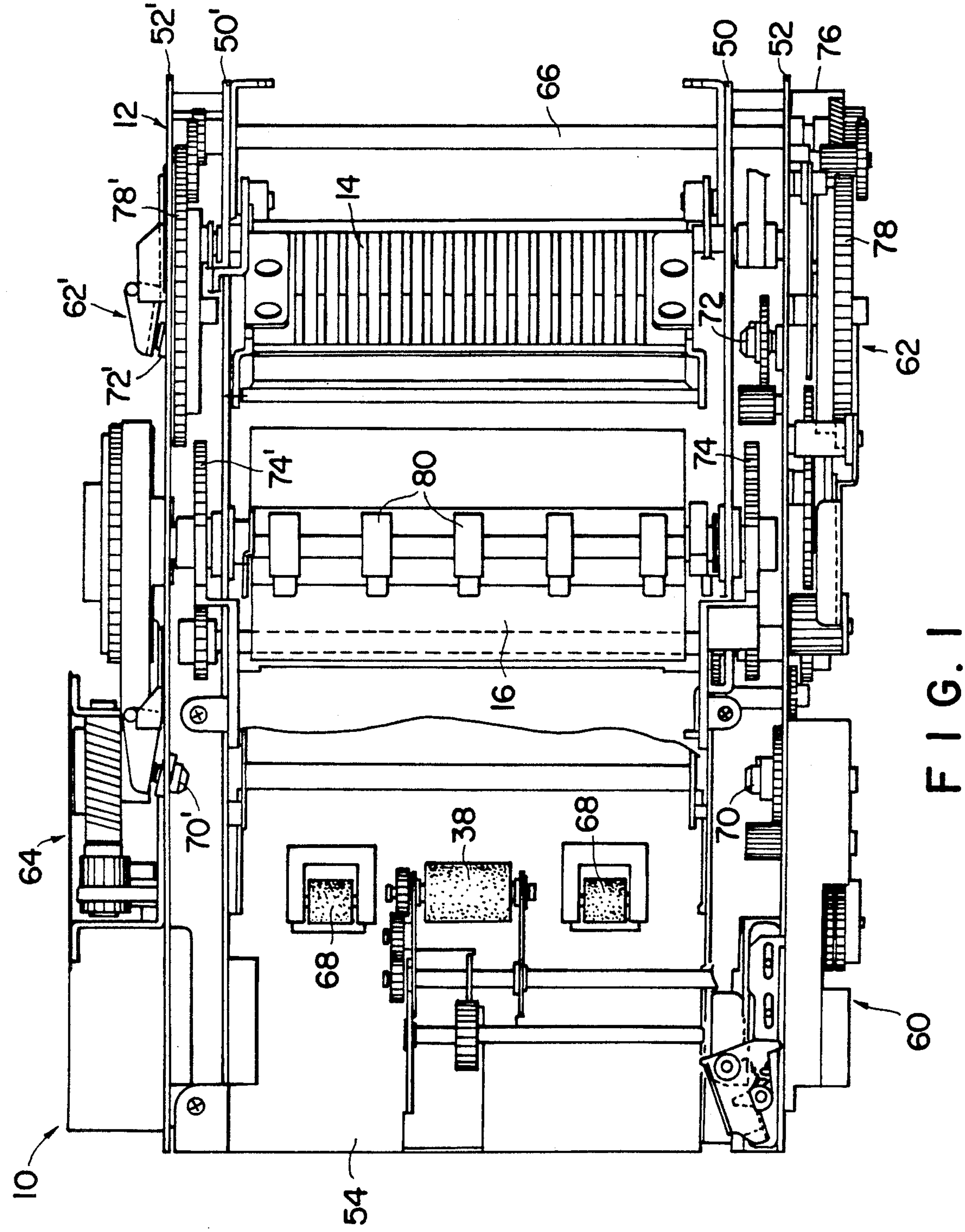
FIG. 1 is a top plan of a color video printer incorporating the head pressing mechanism in accordance with the present invention.

The present invention will now be described more specifically as embodied in the color video printer illustrated in FIG. 1 and therein generally designated 10. As will be seen from both FIGS. 1 and 2, the video printer 10 has a framework 12 to which there are mounted a thermal printing head 14 and a platen 16.

FIG. 3 shows a cassette 18 for use with the video printer 10. The cassette 18 houses both an elongate strip of color ink transfer sheet T and a stack of ink recording sheets R. The color inks are to be thermally transferred from the transfer strip T to each recording sheet R by the printer 10. The cassette 18 is to be partly inserted in the printer 10 through its left hand end as seen in FIG. 1.

Figure 2:
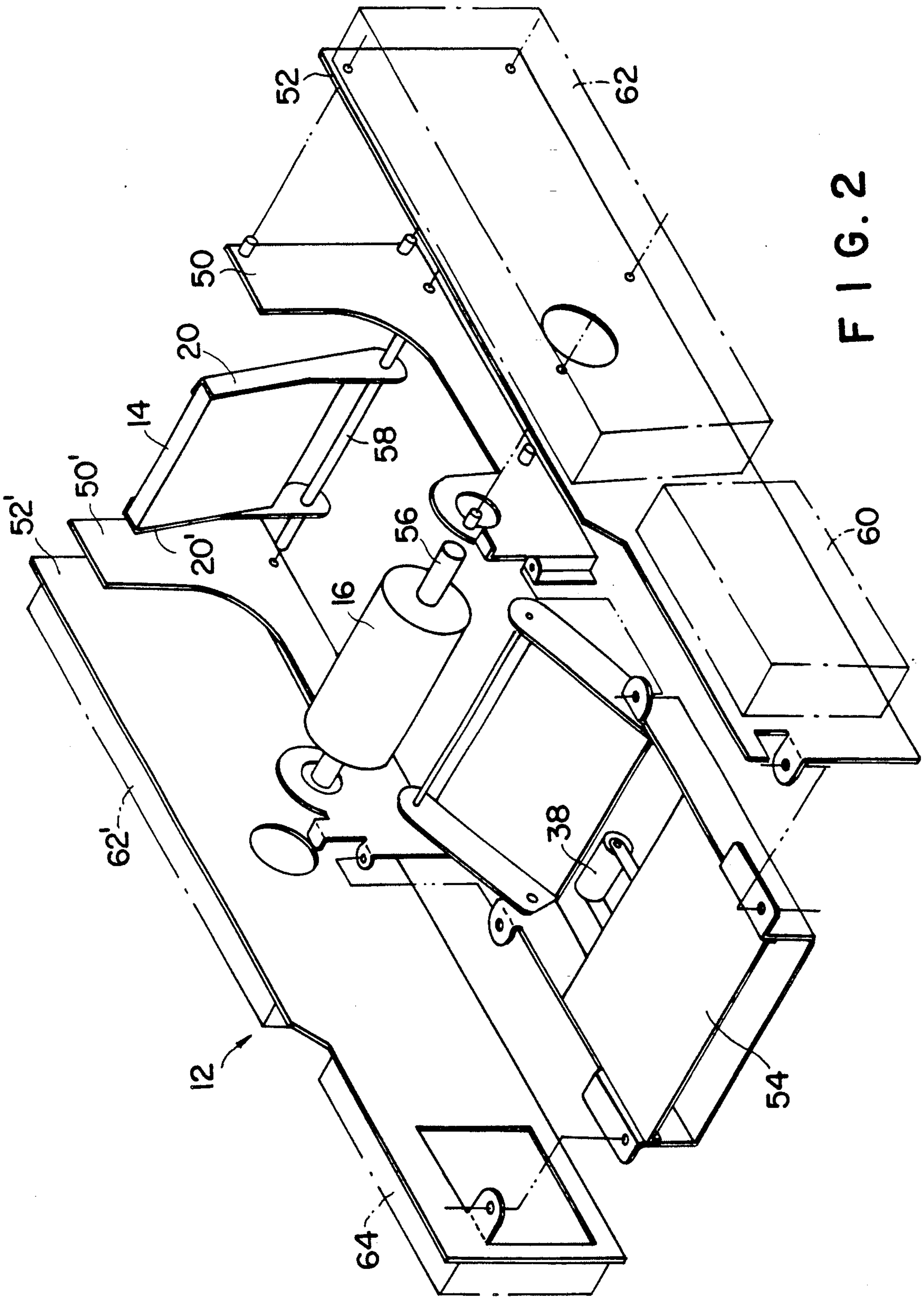
FIG. 2 is a perspective view of the framework of the printer of FIG. 1, shown together with the platen and thermal printing head in proper positional relationship to the framework.

The printer 10 includes means for drawing the color transfer strip T from within the inserted cassette 18 and holding the same over the platen 16, and means for delivering the successive recording sheets R from the inserted cassette onto the platen. The printing head 14 presses the superposed transfer strip T and recording sheet R against the platen 16 for thermal ink transfer from the former to the latter. FIG. 2 best indicates that the printing head 14 is supported by and between a pair of pivoted head arms 20 and 20'.

Figure 4:
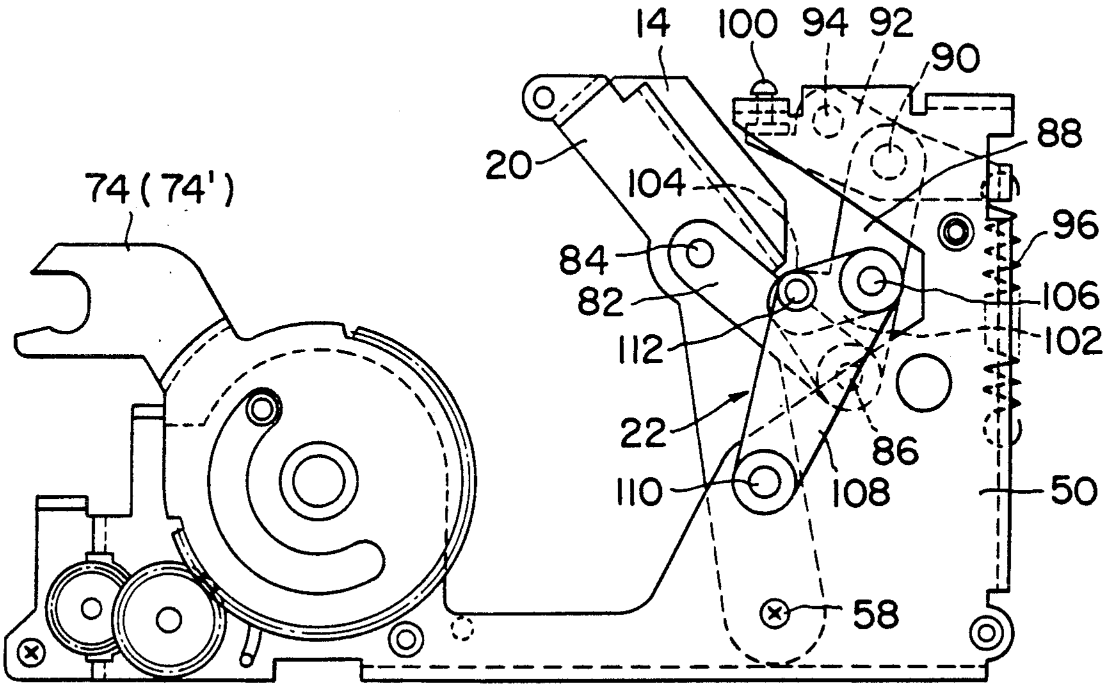
FIG. 4 is an enlarged side elevation of one of a pair of inner sidewalls of the printer of FIG. 1, the representative sidewall being shown together with the head pressing mechanism and loading arm mounted thereto.

At 22 in FIG. 4 is shown a head pressing mechanism for causing the printing head 14 to press the superposed transfer strip and recording sheet against the platen. The head pressing mechanism 22 comprises two dual toggle mechanisms, one seen in FIG. 4, acting one on each of the pair of pivotal head arms 20. The present invention is specifically directed to the improved construction of the head pressing mechanism 20.

The following is a more detailed discussion of the insertable cassette 18, the general printer construction, and the head pressing mechanism 22. Such discussion will be divided under the separate headings for the clarity of disclosure.

Cassette

Figure 3A:
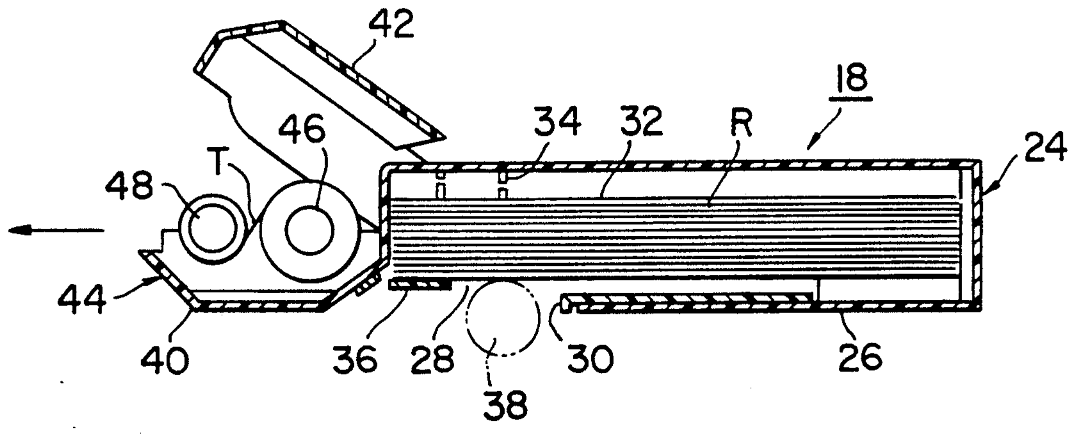
FIGS. 3A to 3C are profiles of an insertable cassette for use with the printer of FIG. 1.

With reference to FIG. 3A the cassette 18 has a generally boxlike housing 24 of plastic material in which there is received the stack of recording sheets R. The bottom 26 of the recording sheet housing 24 has a sheet exit opening 28 formed adjacent to the front end, shown directed to the left, of the housing for a successive withdrawal of the sheets R from the cassette. A sliding cover 30 normally closes the sheet exit opening 28 and is opened automatically by being coordinated with an opening of a pivotal cover 42, as shown, upon insertion of the cassette 18 in the video printer 10.

A pressure plate 32 is mounted atop the stack of recording sheets R for urging them downwardly under the forces of overlying springs 34 in order to assure their smooth withdrawal through the exit opening 28. A pair of spaced retainers 36, one seen, are provided at the sheet exit opening 28 for preventing the sagging of the front end portion of the sheet stack.

At 38 is indicated by a phantom outline a sheet supply roll included in the printer 10, as shown also in FIGS. 1 and 2. The sheet supply roll 38 is to rotate in frictional contact with the lowermost one of the stack of recording sheets R, thereby withdrawing them one by one from the recording sheet housing 24, when the cassette 18 is inserted in the printer 10.

The recording sheet housing 24 has a forward extension 40 of relatively short extent formed in one piece therewith. The forward extension, together with the pivotal cover 42, constitutes a housing 44 for encasing the transfer strip T. The transfer strip cover 42 as well as the sliding cover 30 are normally held closed when the cassette 18 is unloaded out of the video printer 10. The transfer strip T has its opposite ends anchored to, and extends between, a payoff mandrel 46 and a takeup mandrel 48 which are removably seated in the housing 44. It will be noted that the transfer strip is wound in the same direction on each of the rolls 46 and 48 so that a profile of the transfer strip T looks "S" when wound on the two mandrels 46 and 48.

After the cassette 18 is inserted in the printer 10 and the pivotal cover 42 and the sliding cover 30 are opened, the takeup mandrel 48 is taken out of the transfer strip housing 44 unraveling a part of the transfer strip T prerolled around the takeup mandrel 48 and loaded in position within the printer. Thus unraveled from the payoff mandrel 46, the transfer strip T is stretched over the platen 16 seen in FIGS. 1 and 2.

Although not shown in detail, the transfer strip T has a base film on which inks of yellow, magenta and cyan, plus possibly a black ink, are coated or otherwise layered and separated each other as series of repeated combinations of color ink regions each having a common predetermined length along the strip T.

Figure 8:
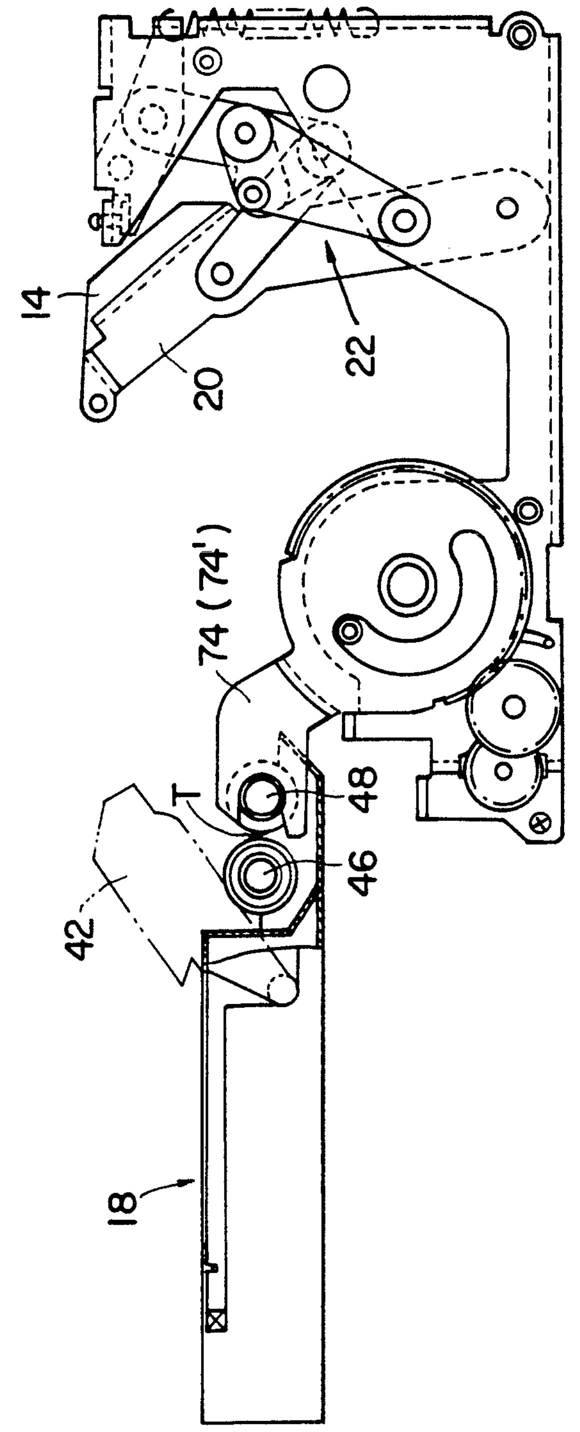
FIG. 8 is a view similar to FIG. 4 except that the loading arm is shown engaged with the transfer strip takeup mandrel of the cassette inserted in the printer.
Figure 9:
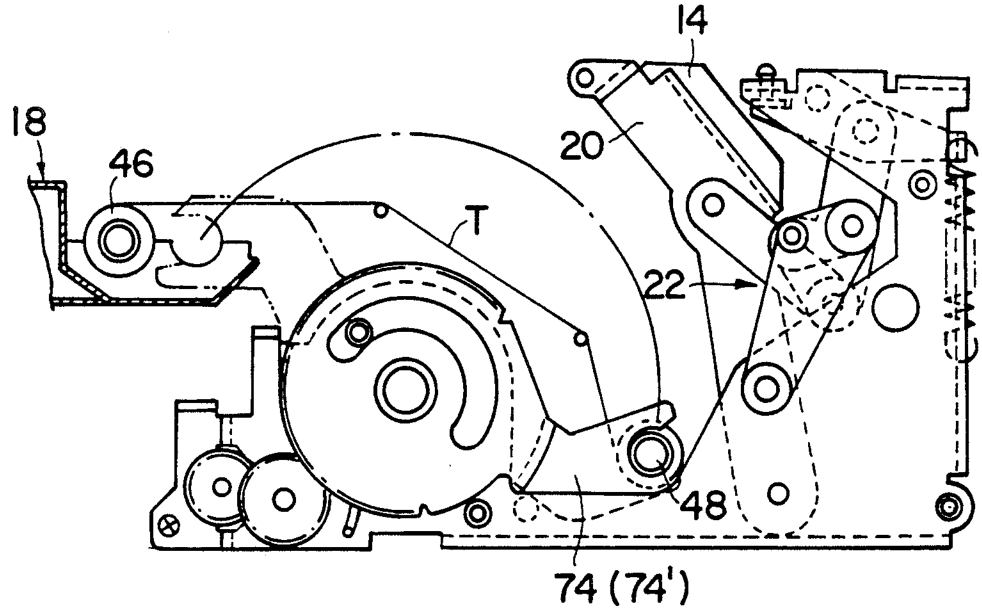
FIG. 9 is also a view similar to FIG. 4 except that the loading arm is shown turned clockwise from its FIG. 8 position for loading the transfer strip takeup mandrel in position within the printer.
Figure 10:
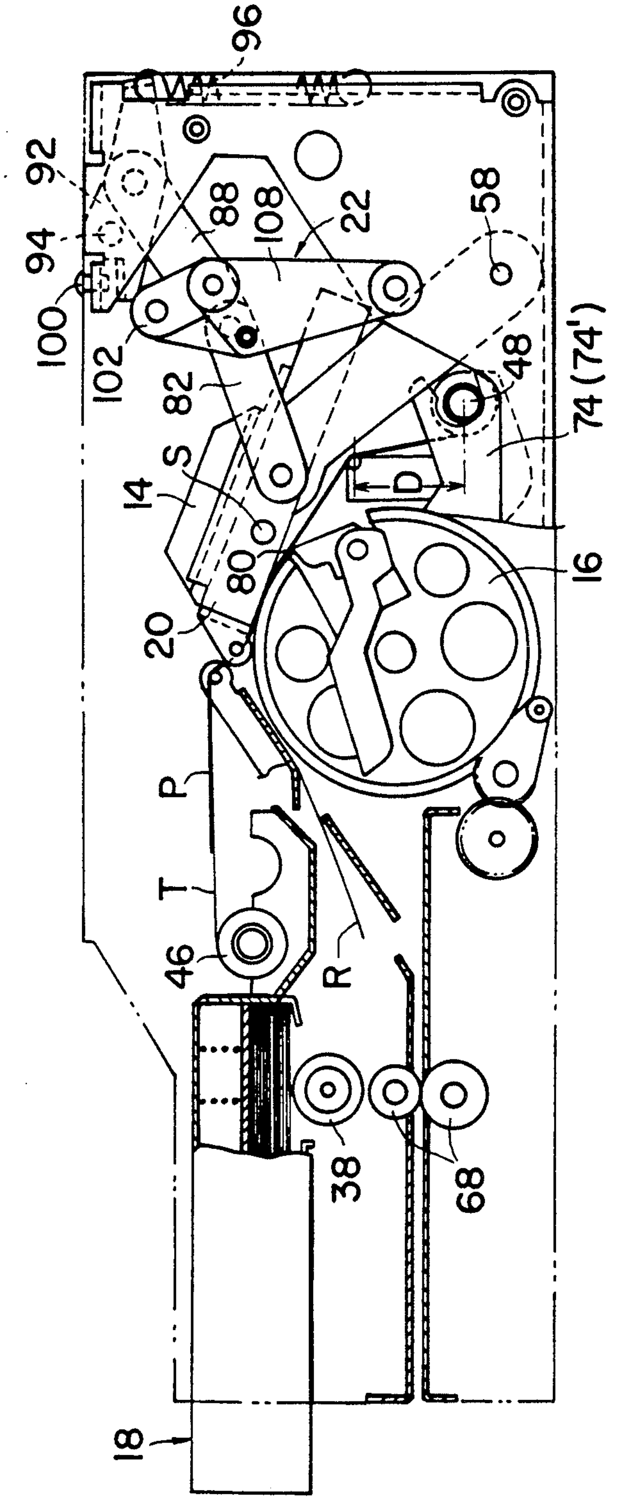
FIG. 10 is a view somewhat similar to FIG. 4 except that the head pressing mechanism is shown actuated to press the printing head against the platen via the superposed transfer strip and recording sheet.

The takeup mandrel 48 removably seated in the transfer strip housing 44 is taken out therefrom by a pair of loading arms 74 and 74' provided in the printer 10 as the arms swing away from the cassette 18 as shown in FIGS. 8 to 10. The takeup mandrel 48 is held loosely in a bifurcated portion of each of the loading arms 74 and 74' so that the prerolled portion of the transfer strip T is allowed to be unwound from the takeup mandrel 48 as it is carried away by the swinging loading arms 74 and 74'. And the "S" shape winding arrangement of the transfer strip T explained previously, prevents the takeup mandrel 48 from rolling off the bifurcated portion of the loading arms 74 and 74' since a predetermined winding direction of the transfer strip T around the takeup mandrel 48 is determined to cause the takeup mandrel 48 rolling deeper into the bifurcated portion in the direction indicated by the arrow in FIG. 3A when the transfer strip T is unwound from the takeup mandrel 48.

As the takeup mandrel 48 is taken out of the cassette 18 and is fully loaded to a position in the printer 10 as indicated FIG. 10, the transfer strip T is unwound from the passively rotated mandrel 48 by a length "1" which is equivalent to a transfer strip path P (thick solid line) extending between two positions of the takeup mandrel 48 one of which is the seated position in the transfer strip housing 44, another is the fully loaded position where the transfer strip T is fully unwound from the takeup mandrel 48 and is simply bound thereto. During this loading operation, the payoff mandrel 46 remains unrotated.

After the takeup mandrel 48 is fully loaded as above, the payoff mandrel 46 is feed for passive rotation, and the takeup mandrel 48 is rotated counterclockwise viewed in FIG. 10, by an unshown spindle of the printer 10, to takeup the transfer strip T by a length "$1+\Delta 1$" i.e. slightly more than the length "1" of the transfer strip path P, this brings the top color ink region (yellow) to a stand-by position to start printing. In order to stop the top color ink region exactly at its stand-by position with respect to the printing head, a kind of marker may be marked on the transfer strip T, which is detectable, by a sensor S, shown in FIG. 10. When the sensor S is located at a distance of D from the fully loaded takeup mandrel 48, the marker is located at a distance of $L=D+1+\Delta 1$ from the end of the transfer strip T, which is bound to the takeup mandrel 48.

When the takeup mandrel 48 is returned to the cassette by the loading arms 74 and 74' for withdrawal of the cassette from the printer 10, the takeup mandrel 48 is freed and the payoff mandrel 46 is driven counterclockwise by another unshown spindle of the printer 10 so as to rewind the transfer strip T by the length "$1+\Delta 1$". This assures that a slack of the transfer strip T if any is fully absorbed during the return of the takeup mandrel 48 into the cassette 18 and the returned takeup mandrel 48 still holds therearound the transfer strip T of the length substantially equivalent to "1" so that the cassette 18 becomes ready for reloading even the transfer strip T has never been used in the previous loadings.

For the foregoing reason, when the cassette 18 is delivered from the factory for sale, a part of the transfer strip T having the length "1" is prerolled on the takeup mandrel 48.

Figure 3B:
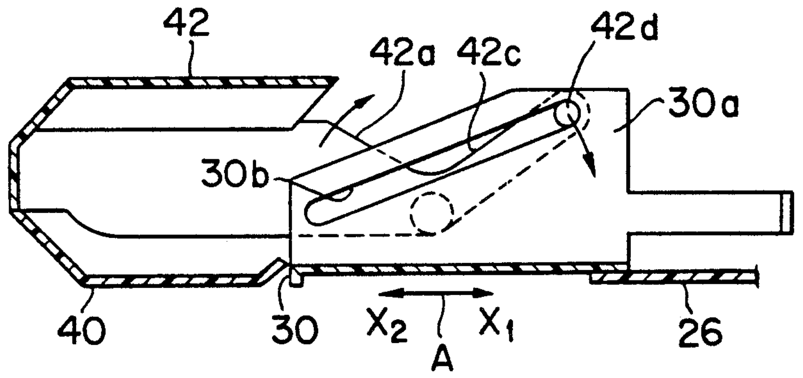
Figure 3C:
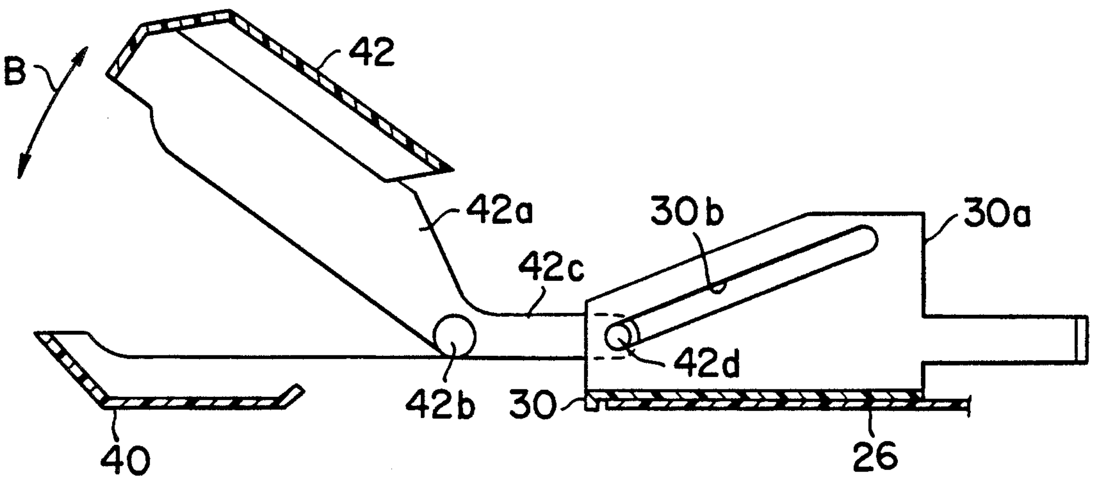

FIG. 3B and 3C show how the pivotal cover 42 which swings to open and close as indicated by the arrow B, is supported and linked to the sliding cover 30. The pivotal cover 42 has a pair of side arms **42*a* unitarily constructed with the pivotal cover 42, each of the side arms is pivoted to the recording sheet housing 24 by a pin 42*b*, and is extended beyond the pin 42*b* to form a rear arm 42*c* having another pin 42*d* at a distal end thereof. The sliding cover 30 slidable as indicated by the arrow A has a pair of side walls 30*a* unitarily constructed with the cover 30, each of the side walls 30*a* has a slant slot 30*b* with which the pin 42** is slidably engaged.

As the cassette 18 is inserted into the printer 10, the sliding cover 30 together with the pair of the side walls **30*a* is pushed backward in the direction X, by an unshown device of the printer 10 to expose the sheet exit opening 28, this causes the rear arm 42*c* swings downward as the pin 42*d* thereof in the slant slot 30*b* is driven downward so that the pivotal cover 42 supported by the pair of the side arms 42*a*, swings to open to expose the takeup and payoff mandrels 46 and 48 for the former to be accessed by the loading arms 74 and 74'**.

Printer Construction

With reference back to FIGS. 1 and 2 the video printer 10 for use with the insertable cassette 18 of the foregoing construction has the framework 12 which is of knockdown construction for the ease of assemblage. The knockdown framework 12 is comprised of a pair of parallel inner sidewalls 50 and 50', a pair of parallel outer sidewalls 52 and 52', and a sheet guide frame 54.

As better illustrated in FIG. 2, the platen 16 is mounted fast on a drive shaft 56 extending between, and rotatably supported by, the inner sidewalls 50 and 50'. The pair of head arms 20 and 20' supporting the printing head 14 is rotatably mounted on a pivot pin 58 which also extends between the inner sidewalls 50 and 50'.

The outer sidewall 52 has mounted to its outside a drive mechanism 60 for transporting the transfer strip T and successive recording sheets R through the printer 10, and a printing control mechanism 62 for controllably driving the various working components of the printer including the head pressing mechanism 22, FIG. 4. The other outer sidewall 52' has mounted to its outside a drive mechanism 64 for the platen 16, and another printing control mechanism 62'. The two printing control mechanisms 62 and 62' are of substantially identical make and are interlocked via a power transmission shaft 66.

The sheet guide frame 54 is provided with the sheet supply roll 38, mentioned with reference to FIG. 3, for supplying the successive recording sheets R from the cassette 18 onto the platen 16. The sheet guide frame 54 is also provided with two pairs of sheet discharge rolls 68, although only one of each pair is seen in FIG. 1, for discharging the successive printed sheets R from the printer. Both sheet supply roll 38 and discharge rolls 68 are driven from an electric motor, not shown, included in the drive mechanism 60.

The drive mechanism 60 is also drivingly connected to a payoff spindle 70 and a takeup spindle 72 both mounted to the outer sidewall 52. Another payoff spindle 70' and another takeup spindle 72' are both mounted to the other outer sidewall 52'. The pair of payoff spindles 70 and 70' are for engagement with the transfer strip payoff mandrel 46 within the cassette 18. The pair of takeup spindles 72 and 72' are for engagement with the transfer strip takeup mandrel 48 as the latter is loaded in position within the printer 10 by a pair of loading arms 74 and 74', the loading arm 74 being shown also in FIG. 4. The transfer strip T is thus transported back and forth between payoff mandrel 46 and takeup mandrel 48. The printing control mechanism 62 controls the movement of the spindles 70 and 72 into and out of driving engagement with the payoff and takeup mandrels 46, 48. The other printing control mechanism 62' controls the movement of the spindles 70' and 72' into and out of engagement with the payoff and takeup mandrels 46, 48.

The pair of printing control mechanisms 62 and 62' share a single electric motor 76 on the outer sidewall 52 for synchronously driving a pair of control cam 78 and 78', each in the shape of a toothed disk, which are rotatably mounted to the outer sidewalls 52 and 52'. The control cams 78 and 78' time the various operating modes of the printer 10 and are used also for driving the head pressing mechanism 22.

The primary functions of the printing control mechanisms 62 and 62' are:

1. Loading of the transfer strip T in the printer 10 by the pair of loading arms 74 and 74'.

2. Actuation of the pair of payoff spindles 70 and 70' and the pair of takeup spindles 72 and 72' into and out of engagement with the payoff and takeup mandrels 46, 48.

3. Clamping of the leading end of each recording sheet R against the platen 16 by a set of clamps seen at 80 in FIG. 1.

4. Determination of a recording sheet supply or discharge mode, a transfer strip drive mode or a recording sheet drive mode.

5. Driving of the head pressing mechanism 22.

6. Ejection of the cassette 18.

The printing control mechanisms 62 and 62' perform all these functions in a predetermined sequence with the synchronized rotation of the control cams 78 and 78'.

Head Pressing Mechanism

As has been mentioned, the head pressing mechanism 22 comprises a pair of dual toggle mechanisms driven respectively by the pair of control cams 78 and 78' and acting respectively on the pair of head arms 20 and 20' supporting the printing head 14. Only one of the dual toggle mechanisms will be described in detail with reference to FIG. 4, it being understood that the same description substantially applies to the other.

Figure 5:
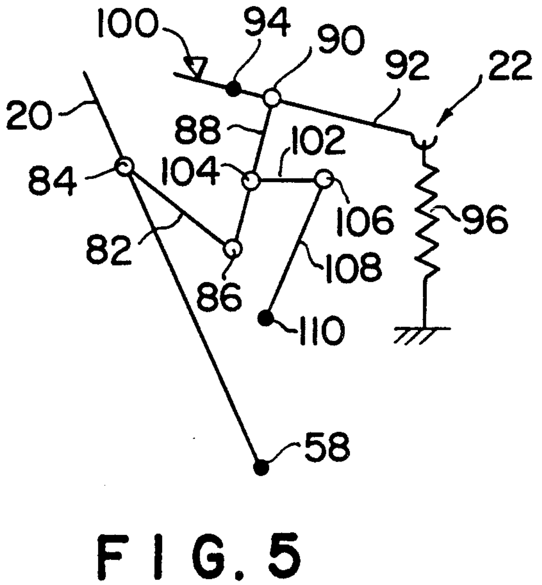
FIG. 5 is a diagrammatic illustration of the head pressing mechanism, with the toggle joints of the head pressing mechanism shown folded to hold the printing head spaced from the platen.

The following description of FIG. 4 will be better understood by referring also to FIG. 5, which schematically illustrates the representative dual toggle mechanism together with the associated head arm 20. The white dots in FIG. 5 indicate displaceable pin joints between the various toggle links and other associated parts whereas the black dots represent fixed pivots on the inner sidewall 50. Both FIGS. 4 and 5 depict the normal state of the dual toggle mechanism, with no actuating force applied thereto, so that the printing head 14 is held spaced from the platen 16. Incidentally, in FIG. 4, the platen is concealed behind the toothed base end portion of the loading arm 74.

The representative dual toggle mechanism includes, first of all, a toggle link 82 having one end pin jointed at a point 84 to the head arm 20. This head arm is pivoted as aforesaid on the pivot pin 58 extending between the pair of inner side walls 50 and 50'. The point 84 is situated intermediate the opposite ends of the head arm 20 and somewhat closer to its free end than to its pivoted end. The other end of the first toggle link 82 is rotatably jointed at a point 86 to one end of a second toggle link 88, the other end of which is rotatably jointed at a point 90 to a lever 92.

This lever 92 is pivoted at its midpoint 94 on the inner sidewall 50. A helical tension spring 96 extends between one end of the lever 92 and a fixed spring retainer, not shown, on the inner sidewall 50, biasing the lever in a clockwise direction about its pivot 94. A limit stop 100 on the inner sidewall 50 limits the clockwise turn of the lever 92.

The representative dual toggle mechanism further includes a third toggle link 102 having one end rotatably jointed at a point 104 to the midpoint of the second toggle link 88. The other end of the third toggle link 102 is rotatably jointed at a point 106 to one end of a fourth toggle link 108. The other end of the fourth toggle link 108 is pivoted at a point 110 on the inner side wall 50. FIG. 4 indicates the third toggle link 102 by the broken lines because this toggle link is hidden behind the fourth toggle link 108 in this view.

In the representative dual toggle mechanism of the foregoing construction, the first 82 and second 88 toggle links constitute a first toggle joint acting between head arm 20 and the lever 92. The third 102 and fourth 108 toggle links constitute a second toggle joint acting between first toggle joint and inner sidewall 50. Both FIGS. 4 and 5 show the two toggle joints fully folded for holding the printing head 14 spaced from the platen 16.

Figure 6:
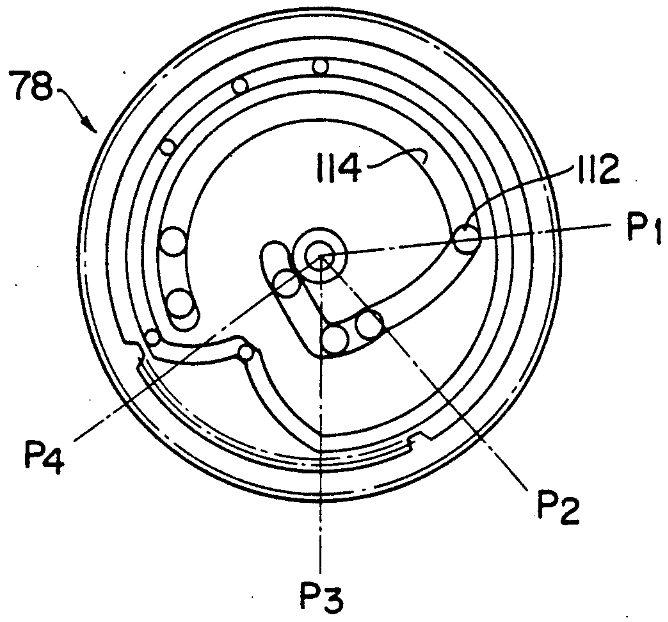
FIG. 6 is an elevation of one of a pair of control cams conjointly driving the head pressing mechanism.

For driving the dual toggle mechanism a cam follower pin is erected at 112 on the fourth toggle link 108. The cam follower pin 112 is slidably engaged in a cam groove 114, FIG. 6, formed in that face of the control cam 78 which confronts the outer sidewall 52. The representative dual toggle mechanism is thus driven from the control cam 78. The second toggle joint comprising the third 102 and fourth 108 links amplifies the driving force applied from the control cam 78. This amplified force is again amplified by the first toggle joint comprising the first 82 and second 88 links. The head arm 20 receives the dually amplified force from the first toggle joint.

Figure 7:
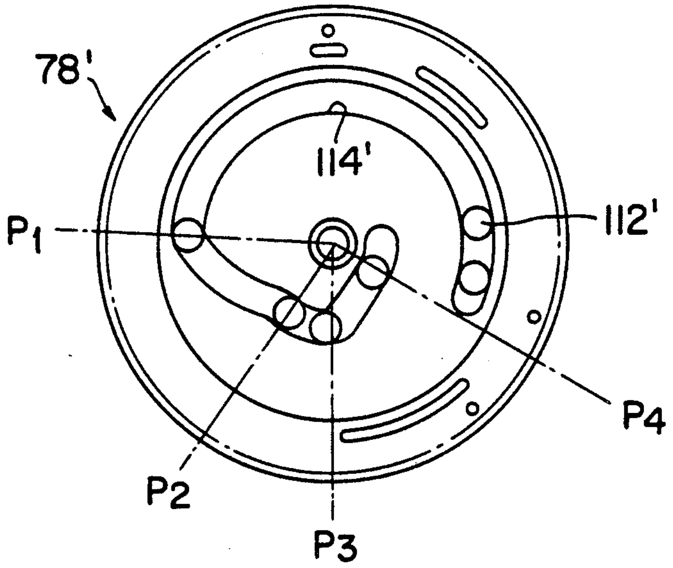
FIG. 7 is an elevation of the other of the pair of control cams.

The other dual toggle mechanism, mounted to the other inner sidewall 50', has a similar cam follower pin 112', FIG. 7, which is received in a cam groove 114' formed in the other control cam 78'. A comparison of FIGS. 6 and 7 will reveal that the cam grooves 114 and 114' are formed in mirror image relationship in the confronting inside faces of the control cams 78 and 78'. Since the control cams 78 and 78' are driven from the common motor 76 in exact phase with each other, the two dual toggle mechanisms are bound to operate in exact synchronism.

Comprising two such dual toggle mechanism, acting one on each of the pair of head arms 20 and 20', the head pressing mechanism 22 according to the invention can press the printing head 14 against the platen 16 under sufficient pressure to assure high quality printing. No dedicated power source is required, but only the torque of the control cams 78 and 78' suffices for driving the dual toggle mechanisms. It will also be appreciated that the dual toggle mechanisms can be compactly arranged within the printer 10, without substantially adding to its size or weight.

Operation

FIG. 8 shows the cassette 18 inserted in the printer 10. The transfer strip cover 42 is open to expose the transfer strip T. The pair of loading arms 74 and 74' have been held standing by in the illustrated angular position, such that they engage the opposite ends of the transfer strip takeup mandrel 48 upon full insertion of the cassette 18 in the printer 10. The angular position of the pair of control cams 78 and 78' is such that the toggle joints of the head pressing mechanism 22 are fully folded, holding the thermal printing head 14 spaced from the platen 16. The printing control mechanisms 62 and 62' will actuate the pair of payoff spindles 70 and 70', FIG. 1, into engagement with the opposite ends of the transfer strip payoff mandrel 46 of the cassette 18 immediately after cassette insertion.

In FIG. 9 are shown the loading arms 74 and 74' subsequently turned clockwise, carrying the transfer strip takeup mandrel 48 from within the cassette 18 to the preassigned working position within the printer 10. The transfer strip T is now stretched over the platen 16. The pair of takeup spindles 72 and 72' will then be actuated into engagement with the opposite ends of the transfer strip takeup mandrel 48. Both transfer strip payoff mandrel 46 and takeup mandrel 48 have now been rotatably supported in position within the printer 10.

As will be noted by referring again to FIGS. 6 and 7, the cam follower pins 112 and 112' are in the position $R_1$ on the control cams 78 and 78' at the end of the clockwise turn of the loading arms 74 and 74'. The toggle joints of the head pressing mechanism 22 still remain folded, holding the thermal printing head spaced from the platen 16 as illustrated in FIG. 9.

Then, as the cam follower pins 112 and 112' relatively travel from position $R_1$ to position $P_2$ on the control cams 78 and 78' with the continued rotation thereof, the toggle joints of the head pressing mechanism 22 will become unfolded to such an extent that the printing head 14 comes closer to the platen 16 but is still spaced therefrom.

Then the sheet supply roll 38 will be actuated into frictional contact with the stack of recording sheets R within the cassette 18 through its sheet exit opening 28, as indicated in FIG. 3.

Then, during the time the control cams 78 and 78' rotate from position $P_2$ to position $P_3$, the transfer strip takeup mandrel 48 will be driven by the drive mechanism 60 in order to bring the first color ink region of the transfer strip T onto a predetermined printing position on the platen 16. The printing head 14 will remain spaced the reduced distance from the platen 16 during this time.

Then, upon actuation of a print switch, not shown, the drive mechanism 60 will impart rotation to the sheet supply roll 38. The lowermost one of the stack of recording sheets R within the cassette 18 will then be withdrawn therefrom and fed into the printer 10 until it comes into abutment against the clamps 80 on the platen 16. Then the clamps 80 will be actuated to fasten the leading end of the recording sheet R against the platen 16. Then the platen 16 will be driven by its drive mechanism 64 until the clamps 80 travel past the printing head 14.

Figure 11:
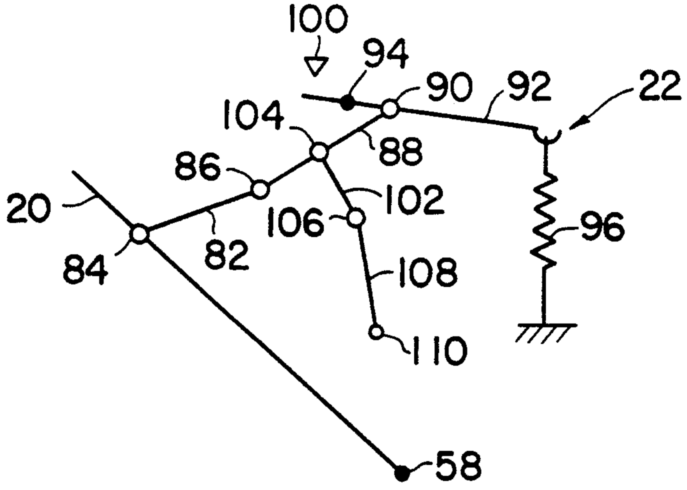
FIG. 11 is a view similar to FIG. 5 except that the toggle joints of the head pressing mechanism are shown unfolded as in FIG. 10.

Then the control cams 78 and 78' will rotate from position $P_3$ to position $P_4$, with the result that the head pressing mechanism 22 is actuated to press the printing head 14 against the platen 16 via the superposed transfer strip T and recording sheet R. FIG. 10 illustrates this state. FIG. 11 also schematically illustrates one of the dual toggle mechanisms as fully extended to press the printing head against the platen.

It will be observed from these illustrations that, acted upon by the control cam 78 via the cam follower pin 112, the toggle link 108 turns counterclockwise about its pivot 110 on the inner sidewall 50. This counterclockwise turn of the link 108 will result in the unfolding of the toggle joint comprising the links 102 and 108. Thereupon the other toggle joint will also become unfolded as its link 88 turns clockwise about its pivot 90 on the spring lever 92. Thus the illustrated representative dual toggle mechanism will turn the head arm 20 counterclockwise about its pivot 58 until the printing head 14 comes into abutment against the platen 16 via the superposed transfer strip T and recording sheet R.

As the control cam 78 continues to act on the toggle link 108, tending to turn the same counterclockwise about the pivot 110, the lever 92 will pivot counterclockwise about the pivot 94 against the force of the tension spring 96. The printing head 14 will therefore be held urged against the platen 16 under the forces of two such tension springs 96 as long as the cam follower pins 112 and 112' remain in the position $P_4$ on the control cams 78 and 78'.

It will now be apparent that the drive linkages from the control cams 78 and 78' to the head arms 20 and 20' need not be of very high mechanical strength or rigidity. Nor is it necessary to use a motor of very high output torque for driving the control cams 78 and 78'. The printer 10 can therefore be made appreciably less in size, weight, and manufacturing cost than its conventional counterpart employing a rotary solenoid.

Pressed against the platen 16 as above, the printing head 14 will cause the ink of the first color (yellow) to be thermally transferred from the transfer strip T to the recording sheet R, with the platen in rotation. The transfer strip takeup mandrel 48 will also be driven by the drive mechanism 60 to wind up the recording sheet R being printed. The same procedure will be repeated thereafter for printing the additional colors of magenta, cyan and black on the same recording sheet. The printed sheet will be discharged by the reverse rotation of the platen 16 and by the rotation of the discharge rolls 68. The operation of the head pressing mechanism 22 can be controlled by the control cams 78 and 78' in full accord with such usual color printing operation of the printer 10.

It is, of course, understood that various modifications may be made in the details of the foregoing disclosure in order to conform to design preferences or to the requirements of each specific application of the dual toggle mechanism suggested hereby.

What is claimed is:

1. A thermal ink transfer printer for use with an insertable cassette in which there are housed both an elongate strip of ink transfer sheet wound at least in part on, and extending between, a payoff mandrel and a detachable takeup mandrel, and a stack of recording sheets for thermally receiving ink from the ink transfer strip, the printer including means for withdrawing the takeup mandrel from within the cassette and holding the takeup mandrel in a preassigned position within the printer in order to hold the ink transfer strip between a thermal printing head and a platen and means for introducing the recording sheets from the cassette onto the platen one by one, wherein the improvement resides in a head pressing mechanism for pressing the thermal printing head against the platen with the transfer strip and a recording sheet for ink transfer interposed between the printing head and the platen, the head pressing mechanism comprising:

(a) frame means;

(b) head support means rigidly supporting the thermal printing head and pivotally mounted to the frame means so that the printing head is movable with the head support means into and out of engagement with the platen with the transfer strip and recording sheet interposed therebetween;

(c) a first toggle joint acting between the frame means and the head support means; and (d) a second toggle joint acting between the frame means and the first toggle joint for causing the first toggle joint to move the head support means toward and away from the platen.

2. The thermal ink transfer printer of claim 1 further comprising resilient means and lever means which is connected to the first toggle joint, said resilient means being connected between the lever means and the frame means for urging the head support means toward the platen.

3. The thermal ink transfer printer of claim 2 wherein:

(a) the lever pivotally mounted to the frame means and operatively connected to the first toggle joint; and (b) the resilient means acts between the lever and the frame means.

4. The thermal ink transfer printer of claim 1 further comprising:

(a) a control cam rotatably mounted to the frame means; and (b) a cam follower formed on the second toggle joint and operatively engaged with the control cam;

(c) whereby the second toggle joint is actuated by the control cam for causing the first toggle joint to move the head support means toward and away from the platen.

5. A thermal ink transfer printer for use with an insertable cassette in which there are housed both an elongate strip of ink transfer sheet wound at least in part on, and extending between, a payoff mandrel and a detachable takeup mandrel and a stack of recording sheets for thermally receiving ink from the ink transfer strip, the printer including means for withdrawing the takeup mandrel from within the cassette and holding the takeup mandrel in a preassigned position within the printer in order to hold the ink transfer strip between a thermal printing head and a platen, and means for introducing the recording sheets from the cassette onto the platen one by one, wherein the improvement resides in a head pressing mechanism for pressing the thermal printing head against the platen with the transfer strip and a recording sheet for ink transfer interposed between the printing head and the platen, the head pressing mechanism comprising:

(a) frame means including a pair of opposed sidewall means;

(b) a pair of head arms rigidly holding the thermal printing head therebetween and pivotally mounted to the frame means in a position between the pair of sidewall means, so that the printing head is movable with the head arms into and out of engagement with the platen with the transfer strip and recording sheet interposed therebetween;

(c) a pair of first toggle joints connected one between each head arm and each sidewall means; and (d) a pair of second toggle joints connected one between each first toggle joint and each sidewall means and conjointly acting to cause the pair of first toggle joints to move the pair of head arms toward and away from the platen.

6. The thermal ink tranfer printer of claim 5 further comprising a pair of resilient means and a pair of lever means which are respectively connected to each first toggle joint, said pair of resilient means being respectively connected between each lever means and each sidewall means for urging the head arms toward the platen.

7. The thermal ink transfer printer of claim 5 further comprising:

(a) a pair of control cams rotatably mounted one to each sidewall means and interconnected for joint rotation; and (b) a pair of cam followers formed one on each second toggle joint and operatively engaged one with each control cam;

(c) whereby the second toggle joints are actuated by the control cams for causing the first toggle joints to move the head arms toward and away from the platen.

* * * * *